(12) United States Patent
Wolfman et al.

(10) Patent No.: US 7,702,642 B1
(45) Date of Patent: Apr. 20, 2010

(54) METHOD, SYSTEM AND COMPUTER-READABLE CODE FOR INSTRUMENTING CODE FOR LOGGING DATABASE-RELATED STRINGS

(75) Inventors: Gadi Wolfman, Herzliya (IL); Shay Kedem, Givatayim (IL); Haim Cohen, Or-Yehuda (IL)

(73) Assignee: Precise Software Solutions, Inc., Redwood Shores, CA (US)

( * ) Notice: Subject to any disclaimer, the term of this patent is extended or adjusted under 35 U.S.C. 154(b) by 727 days.

(21) Appl. No.: 11/295,535

(22) Filed: Dec. 7, 2005

(51) Int. Cl.
*G06F 17/00* (2006.01)

(52) U.S. Cl. .................. 707/101; 707/102; 707/103 Y; 707/104.1; 707/3

(58) Field of Classification Search .................. 707/3, 707/101, 102, 103 Y, 104.1, 2, 8, 9; 709/231; 717/128, 127, 168, 106; 718/100; 704/8
See application file for complete search history.

(56) References Cited

U.S. PATENT DOCUMENTS

| | | | |
|---|---|---|---|
| 6,772,411 B2 * | 8/2004 | Hayes et al. ............... | 717/127 |
| 7,146,352 B2 * | 12/2006 | Brundage et al. .............. | 707/2 |
| 7,546,576 B2 * | 6/2009 | Egli ........................... | 717/106 |
| 7,606,792 B2 * | 10/2009 | Cunningham et al. .......... | 707/3 |
| 2002/0083183 A1 * | 6/2002 | Pujare et al. ................ | 709/231 |
| 2003/0056200 A1 * | 3/2003 | Li et al. ....................... | 717/128 |
| 2003/0220936 A1 * | 11/2003 | Gifford .................... | 707/103 Y |
| 2005/0004892 A1 * | 1/2005 | Brundage et al. .............. | 707/3 |
| 2005/0050046 A1 * | 3/2005 | Puz et al. ....................... | 707/9 |
| 2005/0091035 A1 * | 4/2005 | Kaplan et al. .................. | 704/8 |
| 2007/0016556 A1 * | 1/2007 | Ann et al. ....................... | 707/3 |
| 2007/0271562 A1 * | 11/2007 | Schumacher et al. ........ | 718/100 |
| 2007/0288444 A1 * | 12/2007 | Nelken et al. .................. | 707/3 |
| 2008/0229300 A1 * | 9/2008 | O'Brien ....................... | 717/168 |

FOREIGN PATENT DOCUMENTS

WO    WO 2005/008529 A2 *    1/2005

OTHER PUBLICATIONS

William G. J. Halfond et al., "Combining static analysis and runtime monitoring to counter SQL injection attacks", ACM, May 2005, pp. 1-7.*

Mark Strembeck et al., "An integrated approach to engineer and enforce context constraints in RBAC environments", ACM.\, Aug. 2004, pp. 392-427.*

(Continued)

*Primary Examiner*—Thuy N Pardo
(74) *Attorney, Agent, or Firm*—Swernofsky Law Group PC

(57) ABSTRACT

A method, system and computer readable code for instrumenting code into database access modules are disclosed. According to some embodiments, specific functions within the database access module are identified as query-execution functions, and instructions for logging at least one of database access strings and database connection string during runtime are instrumented into the identified query-execution functions. Exemplary database access strings include database query strings, such as an SQL query string, and stored procedure names. Optionally, additional instructions for extracting various parameters, such as database identifiers, performance parameters, and security policy parameters, from the database connection strings are instrumented. According to some embodiments, the identifying of query-execution functions includes determining if an identity of a candidate function of a database access module matches one of the identifiers of a known execution function. According to some embodiments, a repository of known query execution functions and/or a repository of encoding schema for database connection strings is maintained, for example, using one or more configuration files.

18 Claims, 5 Drawing Sheets

OTHER PUBLICATIONS

Thomas A. Mueck et al., "A configurable type hierarchy index for OODB", ACM, Mar. 1997, pp. 312-332.*

Daniela Floreseu et al., The BEA/XQRL streaming Xquery processor, Google Scholar, 29$^{th}$ VLDB conference 2003, Berlin, Germany, pp. 1-12.*

Precise/Indepth for the J2EE Platform User's Guide Version 6.2 Precise 2003 Precise Software Solutions Ltd. All Rights Reserved pp. 1-205.

STERN. "Beyond Client/Server." Advanced Systems, Apr. 1995, all pages, Sunworld.

SYMANTEC. Symantec i3tm for Microsoft.NET. Data Sheet: Application Performance Management, 2006, pp. 1-4, Symantec Corporation.

VERITAS. "Veritas Indepth for SQL Server." Data Sheet, pp. 1-4, Veritas Software Corporation.

VERITAS. "VERITAS/Indepth for SQL Server V7.1 Highlights." pp. 1-27, Veritas Software.

VERITAS. "VERITAS Insight 7.1 User's Guide." Aug. 2004, pp. 1-170, Veritas Software Corporation.

VERITAS. "VERITAS Indepth for Microsoft.NET 7.1." User's Guide, 2005, pp. 1-102, Veritas Software Corporation.

* cited by examiner

| Named Method "A" 212A | Named Method "B" 212B | ... | Named Method "P" 212P |

DATABASE ACCESS MODULE 210

FIG.3

METHOD, SYSTEM AND COMPUTER-READABLE CODE FOR INSTRUMENTING CODE FOR LOGGING DATABASE-RELATED STRINGS

FIELD OF THE INVENTION

The present invention relates to the field of computer processing, and more particularly, to the instrumentation of performance-monitoring instructions into the code of applications which access one or more databases.

BACKGROUND AND RELATED ART

There is an ongoing need for tools that effectively locate performance bottlenecks in applications that access one or more databases. In particular, there is a need to distinguish between delays attributable to bottlenecks in the database tier (e.g. delays associated with execution of a given SQL statement and/or database stored procedure) and delays derived from execution of the client application code. In some systems, this problem is complicated by the fact that distributed application code residing on one or more client machines accesses a plurality of different databases residing on different database machines. Furthermore, it is noted that in many situations the accessed databases are not accessed exclusively by the performance-monitored application, but rather are simultaneously accessed by other applications.

In order to address the aforementioned issues, there is an ongoing need for systems and methods for monitoring which database services are being accessed by the performance-monitored application, and under which conditions these services are being accessed.

In particular, there is an ongoing need for systems and methods operative to instrument into application code instructions for maintaining a log of database access strings invoked by a particular performance-monitored application. This would, for example, enable the tracking of particular query strings and/or the names of stored procedures invoked by the application.

Furthermore, there is a need for systems and methods operative to instrument into application code instructions for maintaining a log of database connection string, or database connection description strings. In general, connection strings encode a plurality of paramaters related to the database connection used for a specific database call, such performance parameters, database identifiers, and security parameters. Therefore, the logging of database connection strings during runtime is useful for performance-monitoring a given application.

Furthermore, is noted that many database related strings such as SQL statements, stored procedure names, and database connection strings may be generated dynamically during runtime. Therefore, there is an ongoing need for tools which can extract and/or monitor dynamically generated strings during runtime.

SUMMARY OF THE INVENTION

Various embodiments of a system, method and computer readable code for instrumenting code are disclosed. According to some embodiments, the method comprises identifying query-execution functions within binary code or intermediate code of one or more database access modules and instrumenting into the identified query-execution functions instructions for logging at least one of database access strings and database connection strings during runtime.

According to some embodiments, the database access string comprises a database query string, and instructions for logging the database query string are instrumented into the identified query-execution functions.

According to some embodiments, the database access string comprises a stored procedure name, and instructions for logging the stored procedure name are instrumented into the identified query-execution functions.

According to some embodiments, instructions for logging the database connection string are instrumented into the identified query-execution functions.

According to some embodiments, the method further comprises instrumenting instructions for extracting from the database connection string at least one encoded connection parameter selected from the group consisting of a database identifier, a password, a performance parameter and a security policy parameter.

According to some embodiments, at least one database performance parameter is selected from the group consisting of a pooling parameter, a connection policy parameter, a data compression parameter and a connection lifetime parameter.

According to some embodiments, data describing a plurality of encoding schema for a plurality of database access modules is stored (e.g. pre-stored in volatile and/or non-volatile before a time of instrumentation), and the instrumentation of extraction instruction is carried out in accordance with the appropriate stored encoding schema.

According to some embodiments, the method further comprises providing identities of known query-execution functions (e.g. pre-storing the identifies, for example, in a configuration file) of a plurality of database access modules, wherein the identifying comprises determining if an identity of a candidate function within the one or more database access modules matches one of the identifiers of the known query-execution functions.

According to some embodiments, the instrumented instructions comprise at least one instruction to inspect one or more of properties inherited from a base class of a class framework.

These and further embodiments will be apparent from the detailed description and examples that follow.

BRIEF DESCRIPTION OF THE DRAWINGS

FIG. 3 is a schematic chart of an exemplary database access module containing a plurality of named methods.

DETAILED DESCRIPTION

Figure 1:
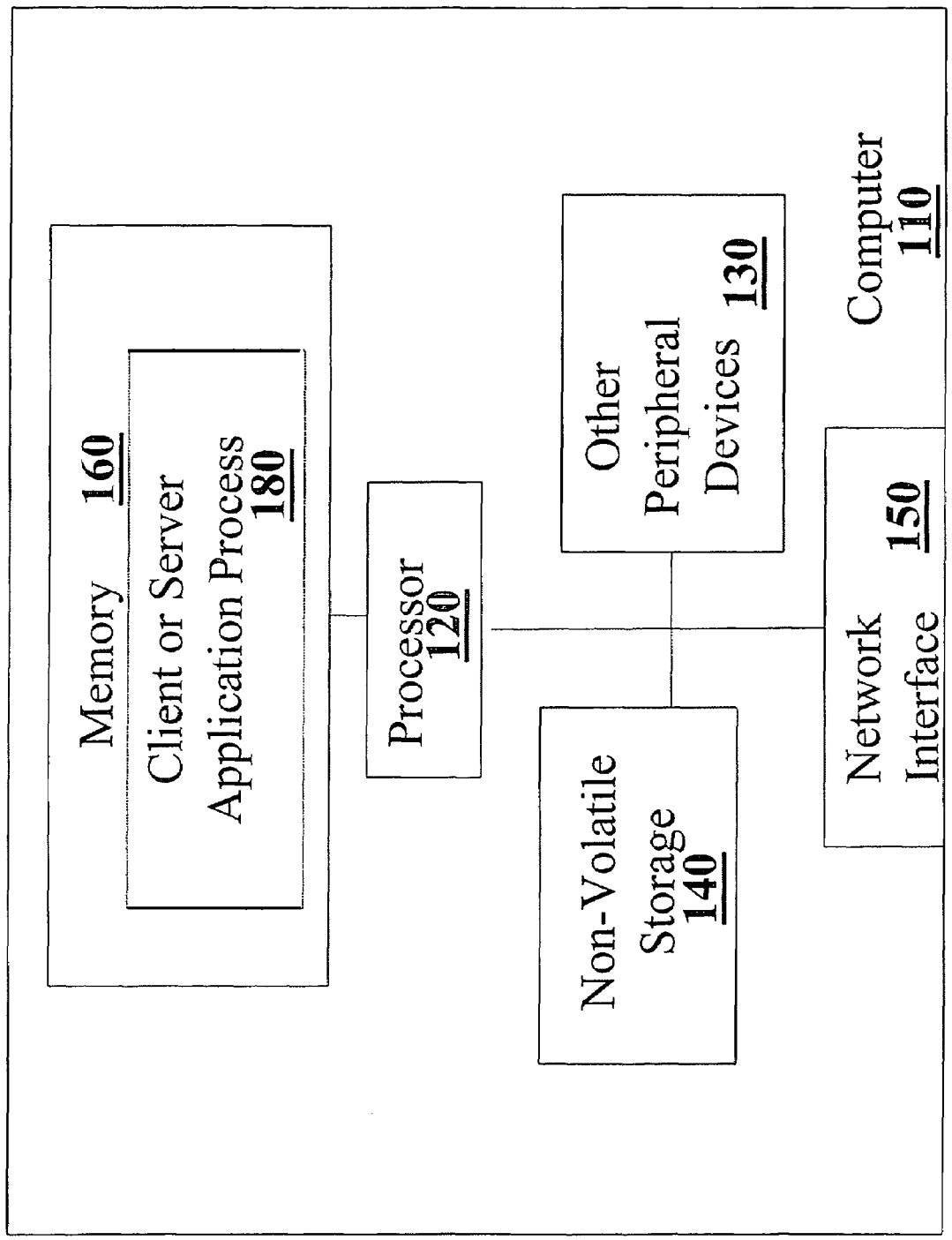
FIG. 1 illustrates one embodiment of a computer including a processor.

The present invention will now be described in terms of specific, example embodiments. It is to be understood that the invention is not limited to the example embodiments disclosed. It should also be understood that not every feature of the presently disclosed system, method and computer-readable code for instrumenting instructions for extracting and/or logging database-related strings is necessary to implement the invention as claimed in any particular one of the appended claims. Various elements and features of devices are described to fully enable the invention. It should also be understood that throughout this disclosure, where a process or method is shown or described, some of the steps of the method may be performed in any order or simultaneously, unless it is clear from the context that one step depends on another being performed first. The general principles described herein may be applied to other embodiments and applications without departing from the scope of the invention. Thus, the present invention is not to be limited to the embodiments shown, but is to be accorded the widest scope consistent with the principles and features described herein FIG. 1 illustrates one embodiment of a computer 110 including a processor 120. Processor 120 is shown coupled to a memory 160, a non-volatile storage 140, other peripheral devices (e.g. keyboard, display, mouse) and a network interface 150 such as a network interface card.

Processor 120 may be configured to execute instructions and to process data according to a particular instruction set architecture (ISA). In one embodiment, processor 120 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 160 may comprise any suitable type of system memory as described above, such as FB-DIMM, DDR/DDR2 SDRAM, or RDRAM®, for example. Memory 160 may include multiple discrete banks of memory. Also, in some embodiments memory 160 may include multiple different types of memory.

In some embodiments, computer 110 may include more than one instance of the devices shown, such as more than one processor 120, for example. In various embodiments, computer 110 may be configured as a rack-mountable server system, a standalone system, or in any other suitable form factor. In different embodiments, computer 110 may be configured as a client system or as a server system.

In one embodiment, processor 120 may be configured to run operating system software such as Microsoft Windows, IBM AIX or Sun Microsystems Solaris. Operating system software may in turn provide an environment in which processor 120 may execute additional software modules in the form of applications, programs, or processes designed to perform specific functions. Running operating system software or software modules may comprise executing instructions that are stored in memory 160. As shown in FIG. 1, a client or server application process resides in the memory 160.

Software modules that may be executed by processor 120 may include, in one embodiment, client/server software such as a web server or a web browser. Alternatively, or in addition, processor 120 may execute software modules comprising network management software, office productivity tools, e-mail programs, etc. Many other types of software may be executed such as a virtual machine runtime environment, a database, an application server, and diagnostic, monitoring, profiling, or analysis software. Furthermore, while executing such software, processor 120 may retrieve data from and store data in non-volatile storage 140 or in memory 160.

As shown in FIG. 1, a client or server application process 180 to be performance-monitored resides in memory 160. In one embodiment, one or more software processes may perform the function of profiling other software processes (e.g. process 180) during operation, gathering and storing data indicative of the operation of one or more of the other software processes. Furthermore, in some embodiments, the gathering of the performance data may be effected by code injected into or instrumented into the actual performance-monitored application and/or into a module associated with the performance-monitoring code. During runtime, the instrumented code resides in the same process space as the performance-monitored application 180 as well as any other associated modules which execute in the same process space as the performance-monitored application.

Figure 2:
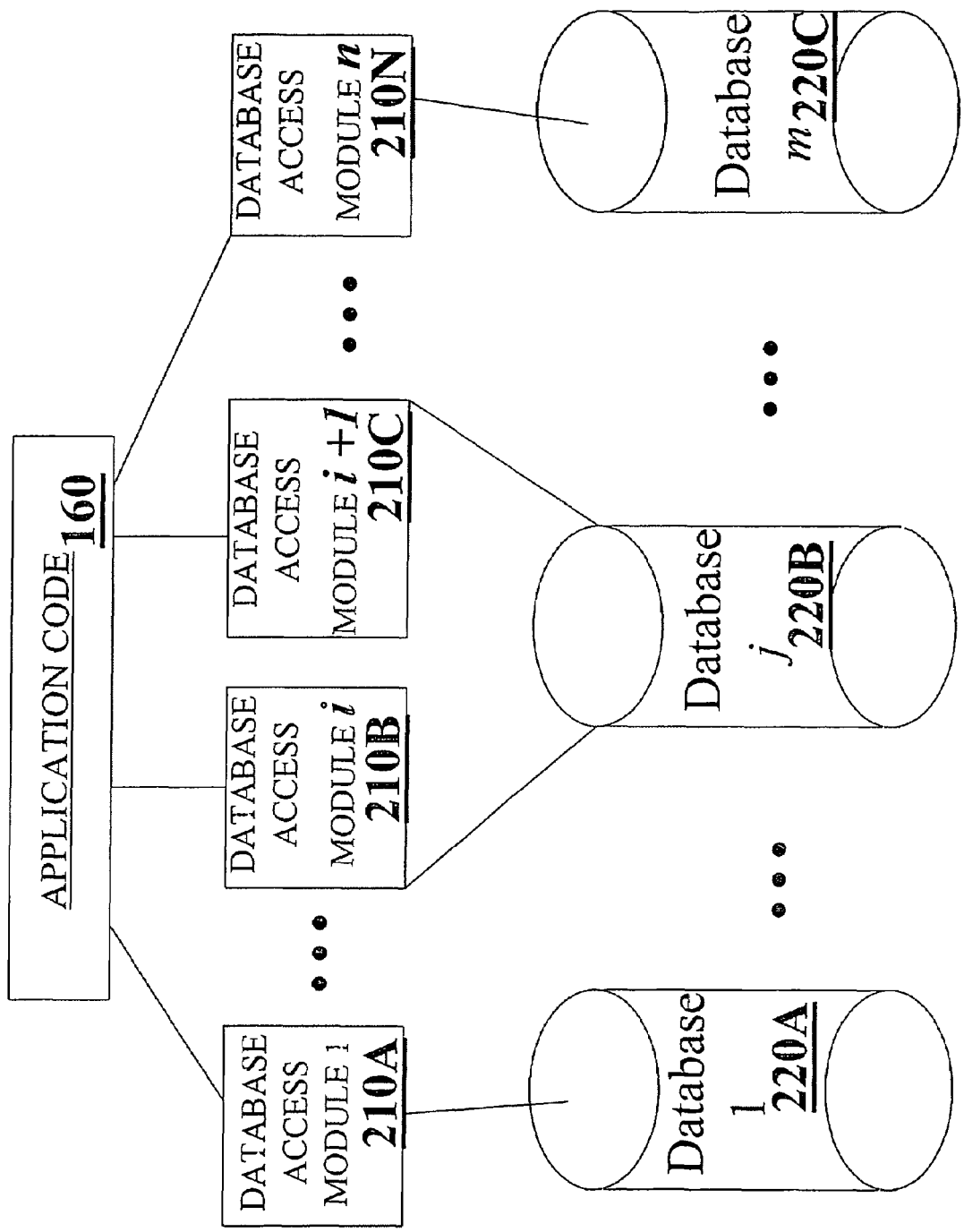
FIG. 2 provides an illustration of an exemplary software architecture where application code accesses one or more databases.

FIG. 2 provides an illustration of an exemplary software architecture where application code 160 accesses one or more databases 220. Each database 220 in FIG. 2 runs within a different process space or on a different machine. Furthermore, it is noted that in some embodiments, databases provided by more than one vendor are accessed by the application code, and thus, as illustrated in FIG. 2, database 220A may, for example, be from provided by a first vendor while database 220B may, for example, be provided by a second vendor. In some exemplary embodiments, the database is a relational database, though this is not a limitation of the present invention. In other examples, the database is a flat file with a structure or a schema (e.g. an XML file, a Microsoft Excel® file, etc). In another example, the database is an object oriented database. Exemplary databases (e.g. relational databases) include but are not limited to SqlServer® and Access® which are available from Microsoft, Oracle® database, Sybase®, MaxDB from SAP®, MySql, and DB2 and Informix which are available from IBM.

Thus, it is noted that typically the application code 160 does not directly write to or read from an individual database 220. Instead, the "low level" operations associated with database access (i.e. communicating with a particular database using the communication protocol of that particular database, connection management, etc.) are handled by a database access module 210, which are otherwise known as "data providers" or as database "connectors." These data providers 210 serve as a bridge between the client application code 160 and the database 220, The code of these database access modules 210 typically resides in the same process space as the application code 160 during runtime. Typically, the database access modules are required to implement a common set of functions (e.g. an API) provided by a programming framework (e.g. .NET platform framework, J2EE framework, etc). This common functionality supported by database access modules provides an environment where developers can create application code that generically invokes various database calls, thereby obviating the need to introduce database vendor specific instructions within the application code. For the specific case of ADO.NET data access modules of the .NET platform, various classes of the data access modules implement the System.Data.IDbCommand interface.

It is noted that in many examples, the source code of the database access modules is not available, and only binary code or intermediate code is available. Thus, in some examples, the application code will invoke database access modules which are provided as an object library, or as a jar file, or as a dll, or as a class file, and the like.

As illustrated in the example of FIG. 2, the application code 160 may access the databases using more than one database access module 210, though it is noted that typically a user will only deploy a single type of database access module 210 per database type. The application code is provided in any known programming language, including but not limited to C#, VB, Java, C, Python, Perl, Rubby, PHP, or any other programming language.

It is noted that in many situations, more than one database access module is available for a single database product 220. For example, it is known that different database access modules for accessing the Oracle database in the .NET framework are distributed by Microsoft as well as Oracle. Thus, according to one example, the application code 160 is .NET application code, and database 220B is an Oracle database which may be accessed by both database access module 210B (e.g. a first .NET data provided for the Oracle database distributed by Microsoft), and data access module 210C (e.g. a second .NET data provider for the Oracle database distributed by Oracle).

To date, some exemplary database access modules 210 or data providers include but are not limited to ASE .NET Data Provider, MySQLDirect .NET Data Provider, ODBC .NET Data Provider, OLE DB .NET Data Provider, Oracle .NET Data Provider—From Microsoft, Oracle .NET Data Provider—From Oracle, OraDirect .NET Data Provider, PostgreSQLDirect .NET Data Provider, and SQL Server .NET Data Provider. The aforementioned list relates to .NET platform database access modules, though it is noted that the present invention relates any programming platforms, including, for example, Java or J2EE, and the database access module 210 or data provider may, in some embodiments, include a set of JDBC drivers written for a certain database.

By way of introduction, it is noted that the gathering of performance data from a specific performance-monitored application may be effected by first injecting or instrumenting performance-monitoring instructions into the application code 160, and then executing these instrumenting instructions during runtime. Furthermore, it is noted that performance-monitoring instructions may also be instrumented into regions of code of the database access modules 210 that are executed during runtime. During runtime, these instrumented instructions instrumented into the database access modules 210 may also be operative to gather performance data related to the execution of the application code 160.

In particular, according to some embodiments, instructions to extract and/or log database related strings may be instrumented into the database access modules 210. For example, instructions to extract and/or log at least one of database access strings and connection description strings during runtime may be instrumented into one or more database access modules 210 by a code instrumentation module.

It is noted that the database access string and/or the connection description string which is extracted and/or logged may be a dynamic string that is generated by the application 160 and/or the database access module 210 during runtime, or alternatively, the string may be a static string.

It is noted that indiscriminate instrumentation of performance-monitoring instructions (i.e. instructions for detecting and/or logging database related strings) at arbitrary locations throughout the database access modules may, in many situations, be problematic. For example, instrumentation of unnecessary instructions may increase both instrumentation overhead and/or runtime overhead. Furthermore, in some examples, indiscriminate instrumentation of performance-monitoring instructions may lead to the generation of a runtime error.

Thus, some embodiments of the present invention provide systems, methods and computer-readable code for instrumenting code at specific chosen locations, or within selected methods or functions. In particular, embodiments of the present invention provide systems and methods for instrumenting instructions for extracting and/or logging database-related strings within specific methods that are selected according to their functionality. In specific embodiments, methods which access the database by reading from or writing to the database are selected for instrumentation.

It is noted that in general, the database access modules 210 or data providers typically include a plurality of methods, each having a unique name or identifier as illustrated in FIG. 3. Furthermore, these methods of database access modules 210 provide a variety of services. For example, some methods are operative to build an SQL string, some methods are operative to build a connection string, some methods access the database by sending a SQL statement or stored procedure name for execution, some methods retrieve a result said from the database. It is noted that when, for example, the source code of the database access modules 210 is unavailable (e.g. the database access module is provided as binary code or as source code), it may be difficult to detect which methods or functions are query execution methods, and which are methods that do not, in fact, access the database.

The present inventors are now disclosing that, in some embodiments, it is useful to instrument instructions for extracting and/or logging database-related strings within methods that access (e.g. read from the database, write to the database, update the database, and/or delete data from the database), the database, referred to here "query-execution" functions or code methods. This allows for a performance-monitoring application to track which specific SQL queries and/or stored procedures are invoked by the application 160 (e.g. as provided in the "database access string"), as well as the conditions these services are being accessed (e.g. as provided by parameters encoded in the "connection string" or "connection description string"). It is noted that throughout this disclosure, the terms function and code methods are used interchangeably.

Furthermore, in some embodiments, the only functions that are instrumented with instructions for extracting and/or logging database-related strings are the actual query-execution functions, though this is not a limitation of the present invention.

There is no limitation on how the particular instrumentation is performed. Thus, according to different embodiments, the instrumentation may include at least one of static instrumentation, which generally involves replacing an application's original executables with instrumented executable, and dynamic instrumentation, where application code may be instrumented at the time the code is actually loaded for execution.

According to some embodiments of the present invention, a repository of the identities of functions that are known to be query-execution functions is maintained for one or more database access modules 210. One example of a repository is a query-execution configuration file which is provided in Appendix A. According to the example of Appendix A, specific known methods (e.g. identified with the "method" tag) of specific classes (e.g. identified with the "name" tag embedded within the "class" tag) which reside within specific libraries (e.g. identified with the "name" attribute of the "dll" tag) are designated as "query-execution" functions. Thus, during or before instrumentation time, the instrumentation module or other code, identifies code methods or code functions 212 within one or more database access modules 210 whose name or identity matches one of the known query-execution functions within the repository, for example, a configuration file (e.g. the XML configuration file of Appendix A).

Figure 4:
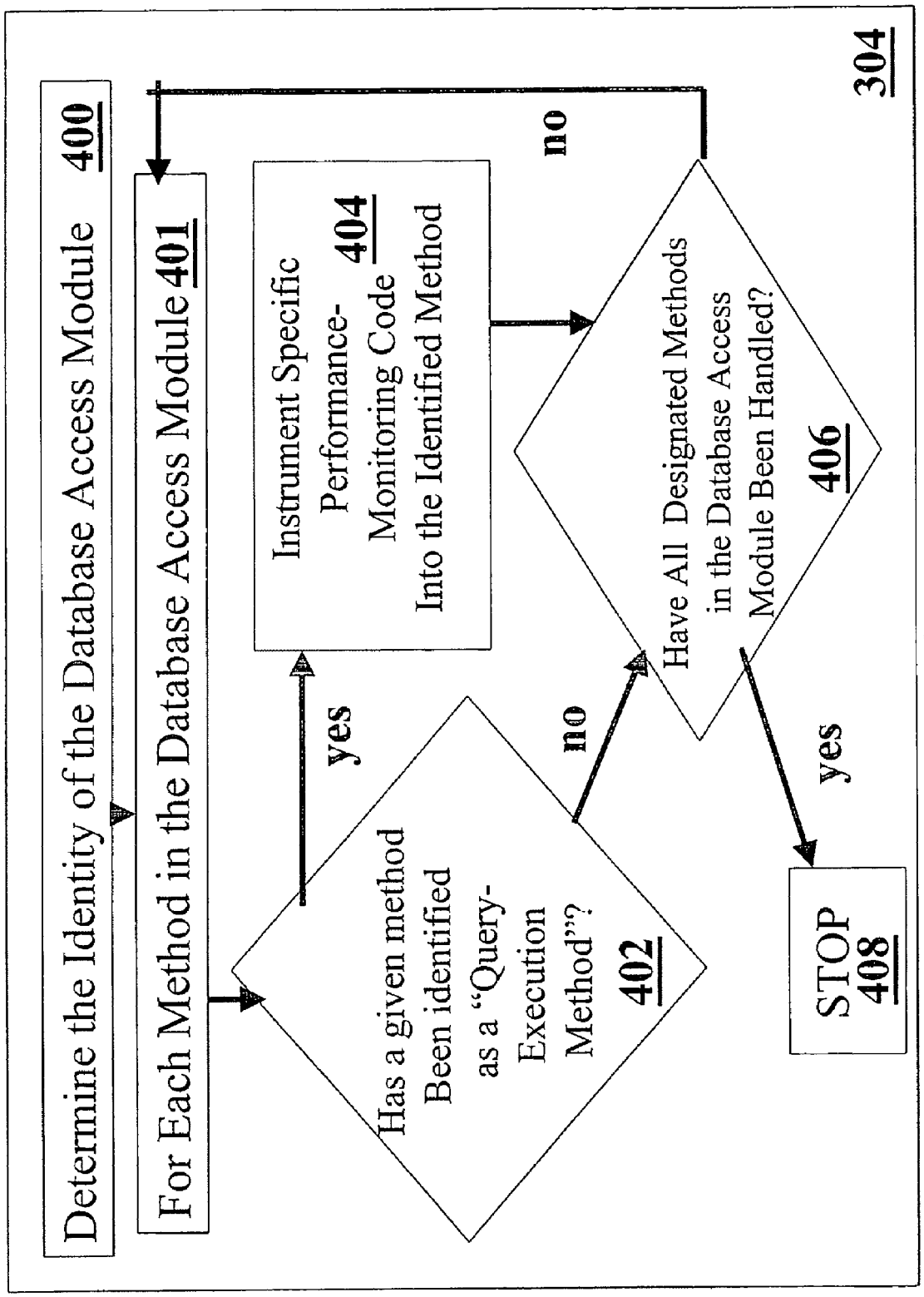
FIG. 4 is flow chart of an exemplary process where performance-monitoring code is instrumented into specific methods of a database access module.

An exemplary implementation of this process is illustrated in FIG. 4, where performance-monitoring code is instrumented into specific methods of an identified 400 database access module. Thus, for a given each method in the database access module 401 (denoted as a "candidate" method), it is decided 402 whether or not the method is a query-execution method, for example, by comparing the identifier of the candidate method (e.g. the method in the database access module being examined) with identifiers of known query-execution methods stored in the repository. In the event that the candidate method identified as a query-execution method (e.g. there is a match between an identifier of the candidate method and an identifier of a known query-execution function), specific performance monitoring code (e.g. code for extracting and/or logging database-related strings such as database access strings and/or connection strings) is instrumented 404 into the method. In some embodiments, this process is repeated for a plurality of methods in the database access module, for example, until all methods or designated methods in the databases module have been handled 406 and selectively instrumented.

It is noted that the aforementioned example of iterating through all possible methods or functions of a database access method is only one technique for selecting candidate methods, and is not a limitation of the present invention. In some examples related to dynamic instrumentation, methods or functions that are likely to be executed are selected and examined to determine whether or not they are query-access functions.

Thus, from the point of view of a vendor or of a provider of instrumentation software or performance-monitoring software including routines for instrumenting code, it is possible to provide software which selectively instruments the appropriate code methods by appropriately maintaining the configuration file. Thus, the specific database access modules which are distributed to developers are known, and whenever a new database access module is distributed, or whenever modifications are made to known database access modules, the configuration file is updated appropriately, and distributed to users of the instrumentation software or the performance-monitoring software.

Referring once more to Appendix A, it is noted that in some instances where a query-execution function is associated with a given class, it is, nevertheless, sometimes not necessary to maintain specific records for that given class. More specifically, when the query-execution function is part of an interface, the query-execution function can be identified as part of this interface. Thus, the configuration file of Appendix A provides instructions to instrument all the methods of any classes which implement a specific interface, where the interface is designated with the "name" tag that is embedded within the "interface" tag.

There are not specific limitations on the specific instructions that are instrumented into the database access modules. Thus, according to one specific example related to the .NET platform, the present inventors have noted that every .NET database access module is required to implement a Command Class. Furthermore, it is observed that the Command Class inherits the IdbCommand interface, and thus every database access module can be relied on to provide a reference to both the IdbCommand.CommandText property, whose value reflects either the current SQL statement or the stored procedure name, as well as the IdbCommand.Connection.ConnectionString property, whose value reflects the value of the connection string. Thus, according to this example, instructions to log the IdbCommand.CommandText and/or instructions to log IdbCommand.Connection.ConnectionString properties are instrumented within the given identified query execution function.

Thus, according to some embodiments, the classes of the database modules are required to inherit properties from a base class of a class framework (for example, the .NET framework), and the instrumented instructions include at least one instruction to inspect one or more of the inherited properties (e.g. an instruction to inspect the IdbCommand.CommandText property, or an instruction to inspect the IdbCommand.Connection.ConnectionString property).

Figure 5:
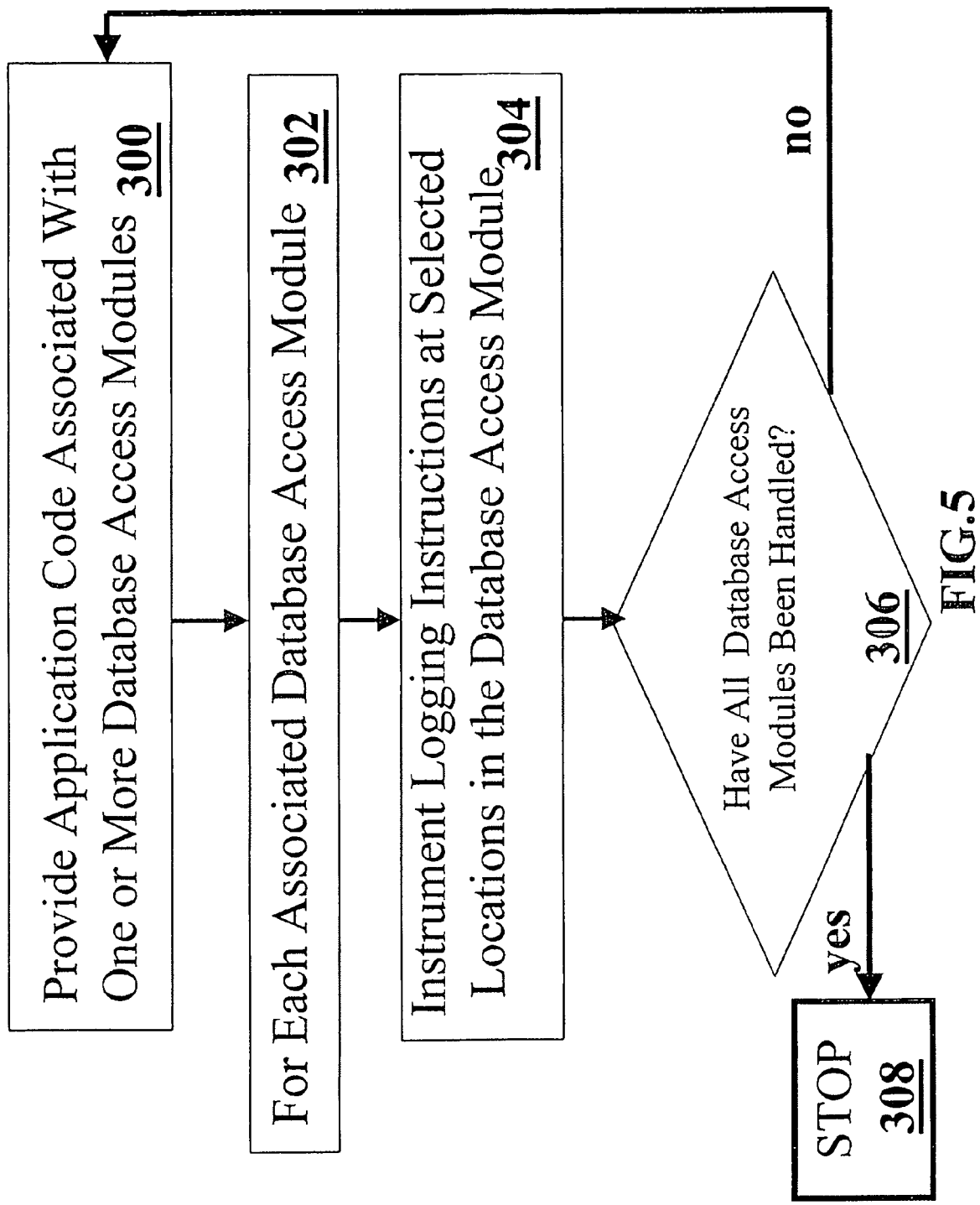
FIG. 5 is flow chart of an exemplary process where performance-monitoring code is instrumented into specific methods of one or more database access modules.

As stated earlier, with reference to FIG. 2, it is noted that in some systems, the application code 160 accesses more than one database module 210. Thus, in some embodiments, each database access module is examined for query execution functions during or before instrumentation. Thus, referring to FIG. 5, it is noted that after application code associated with one or more database access modules is provided 300, each 302 associated database access module 210 is handled. For each database access module, logging instructions are instrumented 304 at selected locations (e.g. within the query access functions) in the database access module.

By way of introduction, it is noted that exemplary database-related strings that can be extracted and/or logged during runtime include database access strings (e.g. database queries and/or stored procedure identifiers), which describe which database services are being accessed by the performance-monitored application 160, as well as database connection strings or database connection description strings, which describe under which conditions these services are being accessed.

In general, database connection strings encode a plurality of parameters related to the database connection used for a specific database call. Relevant parameters encoded by the connection string include but are not limited to a database identifier of a specific database accessed with the connection (e.g. an identifier derived from one or more parameter such as a machine address, a port, a database instance name), database performance parameters (e.g. connection policy parameters for determining whether or not there is pooling, pooling parameters such as minimum pool size or maximum pool size, as well as connection lifetime parameters describing how long to maintain the connection before timing out), performance parameters and a security policy parameters.

Below is one exemplary portion of a connection string for the SqlConnection (.NET) data provider for SQL server:
  "Server=Aron1;Database=pubs;UserID=sa;
    Password=asdasd;Trusted_Connection=False".

According to this connection string, the "Server" field is set to "Aron1", the "Database" field is set to "pubs", the "UserID" field is set to "sa", the "Password" field is set to "asdasd" and the "Trusted Connection" field is set to "False." The semicolon is used as a delimiter between fields.

Thus, it is noted that according to this example, the "Server" field is a database identifier because it identifies, at least in part, the database destination. The "Trusted_Connection" parameter is a security policy parameter.

Below is one exemplary portion of a connection string for the Core Labs MySQLDirect (.NET) data provider for MySql:
  "User ID=root; Password=pwd; Host=localhost;
    Port=3306; Database=test;Direct=true; Protocol=TCP;
    Compress=false; Pooling=true; Min Pool Size=0;Max
    Pool Size=100; Connection Lifetime=0"

Thus, according to this example, the pool sizes are defined in the connection string, along with the communications protocol, along with a directive of whether or not to use pooling. Furthermore, the data compression parameter (e.g. whether or not to use data compression, what type of data compression, how much data compression etc) is a performance parameter that defines whether or not to use data compression.

According to some embodiments, instructions for extracting and/or logging one or more of the aforementioned parameters, and/or for extracting and/or logging any parameter encoded by the connection string are instrumented into the database access module 220 and/or into the application code 160.

In general, each database access module 210 employs a different schema for encoding relevant database parameters within a connection string. According to some embodiments, a plurality of encoding schemas are pre-stored (e.g. in a configuration file), where a different encoding schema is pre-stored for each database access module 210. It is noted that each encoding schema provides enough information for extracting each parameter from the connection string.

Appendix B provide an exemplary configuration file (e.g. an XML file) containing data describing a plurality of configuration schema. Thus, in some embodiments, instrumentation code or code associated with instrumentation code (e.g. in performance-monitoring software) is operative to generate instructions for extracting one or more parameters for extracting relevant parameters from the connection string in accordance with the pre-stored encoding schema (e.g. as provided in the configuration file), which is accessed by the instrumentation software or performance monitoring software.

Thus, from the point of view of a vendor or of a provider of instrumentation software or performance-monitoring software including routines for instrumenting code, it is possible to provide software which appropriately extracts relevant parameters from any connection string for any known database access module by updating the configuration file in accordance with currently distributed database access modules. When the schema for encoding parameters in connection strings changes, or when a new database access module is distributed and made available, this configuration file is updated and made available to users.

Referring specifically to the exemplary configuration file of Appendix B, it is notice that in many known systems, database configuration strings contain the names of a plurality of fields whose value is to be set, as well as the parameter values to be used. Thus, in many known systems, the database connection string is a concatenated string including a directive setting each field to each value. It is notice that while most connection strings tend to set the same or similar fields, the exact syntax, and more specifically the identifier or name for a particular field may vary between database access modules. Thus, referring to Appendix B, it is noted that relevant database access modules (e.g. identified in by the "namespace" tag embedded in the "provider" tag) that are treated include Sybase.Data.AseClient, CoreLab.MySql, System.Data.Odbc, System.Data.OleDb, System.Data.OracleClient, etc. Thus, according to the example of Appendix B, each database access module encodes a parameter for the server name (e.g. for identifying the address, name or location of the server) and encodes a parameter for the dbname. Nevertheless, the specific title of this field as encoded in the connection string varies between database access modules. Thus, in the example of Appendix B, for the database access module "Sybase.Data.AsaClient", the name of the server name field is "Data Server" and the name of the dbname filed is "Initial Catalog."

Further, it is noted that the provider "System.Data.Odbc" appears several times in the file, illustrating that in some examples, the same data provider can service more than one type of databases. This reflected in the file by the "proper-tyName" filed followed by the "propertyValue" field. Thus, for the example of data provider System.Data.Odcb, this provider can service Sql Server, Microsoft ODBC for Oracle, Microsft Access, Sybase System 11, and others listed in the file.

Appendices

APPENDIX A

```
<defaults>
  <dlls>
    <dll name="System.Data.Oracleclient.dll">
      <instrument>
        <classes>
          <class>
            <name>System.Data.OracleClient.OracleCommand</name>
            <called-method>
              <methods>
                <method type="AdoDotNet">
                  <name>ExecuteOracleNonQuery</name>
                </method>
                <method type="AdoDotNet">
                  <name>ExecuteOracleScalar</name>
                </method>
                <method type="AdoDotNet">
                  <name>ExecuteReader</name>
                </method>
                <method type="AdoDotNet">
                  <name>ExecuteScalar</name>
                </method>
                <method type="AdoDotNet">
                  <name>ExecuteNonQuery</name>
                </method>
                <method type="AdoDotNet">
                  <name>Prepare</name>
                </method>
              </methods>
            </called-method>
          </class>
        </classes>
      </instrument>
    </dll>
    <dll name="System.Data.dll">
      <instrument>
        <classes>
          <class>
            <name>System.Data.SqlClient.SqlCommand</name>
            <called-method>
              <methods>
                <method type="AdoDotNet">
                  <name>ExecuteXmlReader</name>
                </method>
              </methods>
            </called-method>
          </class>
        </classes>
      </instrument>
    </dll>
    <dll name="Oracle.DataAccess.dll">
      <instrument>
        <classes>
          <class>
            <name>Oracle.DataAccess.Client.OracleCommand</name>
            <called-method>
              <methods>
                <method type="AdoDotNet">
                  <name>ExecuteReader</name>
                </method>
                <method type="AdoDotNet">
                  <name>ExecuteScalar</name>
                </method>
                <method type="AdoDotNet">
                  <name>ExecuteNonQuery</name>
                </method>
                <method type="AdoDotNet">
                  <name>ExecuteXmlReader</name>
                </method>
              </methods>
            </called-method>
```

APPENDIX A-continued

```
      </class>
    </classes>
   </instrument>
  </dll>
 </dlls>
 <!-- Instrument all the methods of classes which implement the
following interfaces. -->
 <instrument>
  <interfaces>
   <interface>
    <name>System.Data.IDbCommmand</name>
    <called-method>
     <methods>
      <method type="AdoDotNet">
       <name>ExecuteReader</name>
      </method>
      <method type="AdoDotNet">
       <name>ExecuteScalar</name>
      </method>
      <method type="AdoDotNet">
       <name>ExecuteNonQuery</name>
      </method>
      <method type="AdoDotNet">
       <name>Prepare</name>
      </method>
     </methods>
    </called-method>
   </interface>
  </interfaces>
 </instrument>
</defaults>
```

APPENDIX B

```
<providers>
 <provider>
  <namespace>Sybase.Data.AseClient</namespace>
  <server>Data Source</server>
  <dbname>Initial Catalog</dbname>
 </provider>
 <provider>
  <namespace>CoreLab.MySql</namespace>
  <server>Host</server>
  <dbname>Database</dbname>
 </provider>
 <provider>
  <namespace>System.Data.Odbc</namespace>
  <propertyName>driver</propertyName>
  <propertyValue>{SQL Server}</propertyValue>
  <server>Server</server>
  <dbname>Database</dbname>
 </provider>
 <provider>
  <namespace>System.Data.Odbc</namespace>
  <propertyName>driver</propertyName>
  <propertyValue>{Microsoft ODBC for Oracle}</propertyValue>
  <server>Server</server>
  <dbname>Server</dbname>
 </provider>
 <provider>
  <namespace>System.Data.Odbc</namespace>
  <propertyName>driver</propertyName>
  <propertyValue>{Microsoft Access Driver (*.mdb)}
  </propertyValue>
  <server>Dbq</server>
  <dbname>Dbq</dbname>
 </provider>
 <provider>
  <namespace>System.Data.Odbc</namespace>
  <propertyName>driver</propertyName>
  <propertyValue>{Sybase System 11}</propertyValue>
  <server>SRVR</server>
  <dbname>DB</dbname>
 </provider>
 <provider>
  <namespace>System.Data.Odbc</namespace>
```

APPENDIX B-continued

```
  <server>Dsn</server>
  <dbname>Dsn</dbname>
 </provider>
 <provider>
  <namespace>System.Data.OleDb</namespace>
  <propertyName>Provider</propertyName>
  <propertyValue>IBMDA400.DataSource.1</propertyValue>
  <server>Data source</server>
  <dbname>Data source</dbname>
 </provider>
 <provider>
  <namespace>System.Data.OleDb</namespace>
  <propertyName>Provider</propertyName>
  <propertyValue>IBMDA400.DataSource.1</propertyValue>
  <server>Data source</server>
  <dbname>Data source</dbname>
 </provider>
 <provider>
  <namespace>System.Data.OleDb</namespace>
  <propertyName>Provider</propertyName>
  <propertyValue>Microsoft.Jet.OLEDB.4.0</propertyValue>
  <server>Data source</server>
  <dbname>Data source</dbname>
 </provider>
 <provider>
  <namespace>System.Data.OleDb</namespace>
  <propertyName>Provider</propertyName>
  <propertyValue>OraOLEDB.Oracle</propertyValue>
  <server>Data source</server>
  <dbname>Data source</dbname>
 </provider>
 <provider>
  <namespace>System.Data.OleDb</namespace>
  <propertyName>Provider</propertyName>
  <propertyValue>sqloledb</propertyValue>
  <server>Data Source</server>
  <dbname>Initial Catalog</dbname>
 </provider>
 <provider>
  <namespace>System.Data.OleDb</namespace>
  <propertyName>Provider</propertyName>
  <propertyValue>Sybase ASE OLE DB Provider</propertyValue>
  <server>Server</server>
  <dbname>Database</dbname>
 </provider>
 <provider>
  <namespace>System.Data.OracleClient</namespace>
  <server>Data Source</server>
  <dbname>Data Source</dbname>
 </provider>
 <provider>
  <namespace>Oracle.DataAccess.Client</namespace>
  <server>Data Source</server>
  <dbname>Data Source</dbname>
 </provider>
 <provider>
  <namespace>CoreLab.Oracle</namespace>
  <server>Host</server>
  <dbname>Host</dbname>
 </provider>
 <provider->
  <namespace>EID.MySqlClient</namespace>
  <server>Data Source</server>
  <dbname>Database</dbname>
 </provider>
 <provider>
  <namespace>CoreLab.PostgreSql</namespace>
  <server>Host</server>
  <dbname>Database</dbname>
 </provider>
 <provider>
  <namespace>System.Data.SqlClient</namespace>
  <propertyName>Initial Catalog</propetyName>
  <propertyValue>__exists__</propertyValue>
  <server>Data Source</server>
  <dbname>Initial Catalog</dbname>
 </provider>
 <provider>
  <namespace>System.Data.SqlClient</namespace>
```

APPENDIX B-continued

```
    <propertyName>Data Source</propertyName>
    <propertyValue>__exists__</propertyValue>
    <server>Data Source</server>
    <dbname>Database</dbname>
  </provider>
  <provider>
    <namespace>System.Data.SqlClient</namespace>
    <propertyName>Server</propertyName>
    <propertyValue>__exists__</propertyValue>
    <server>Server</server>
    <dbname>Database</dbname>
  </provider>
</providers>
```

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method comprising:
   in a computing device,
   maintaining a configuration file, said configuration file including identifiers of query-execution functions;
   identifying query-execution functions within binary code or intermediate code of one or more database access modules, in response to the identifiers; and
   instrumenting into the identified query-execution functions instructions operable to profile the query-execution functions by logging at least one of database access strings and database connection strings during runtime of the query execution functions.

2. The method of claim 1 wherein the database access string comprises a database query string, and instructions for logging the database query string are instrumented into the identified query-execution functions.

3. The method of claim 1 wherein the database access string comprises a stored procedure name, and instructions for logging the stored procedure name are instrumented into the identified query-execution functions.

4. The method of claim 1 wherein instructions for logging the database connection string are instrumented into the identified query-execution functions.

5. The method of claim 4 further comprising:
   instrumenting instructions for extracting from the database connection string at least one encoded connection parameter selected from the group consisting of a database identifier, a password, a communications protocol, a performance parameter and a security policy parameter.

6. The method of claim 5 wherein at least one database performance parameter is selected from the group consisting of a pooling parameter, a connection policy parameter, a data compression parameter and a connection lifetime parameter.

7. The method of claim 5 wherein data describing a plurality of encoding schema for a plurality of database access modules is stored, and the instrumentation of extraction instruction is carried out in accordance with the appropriate stored encoding schema.

8. The method of claim 1 wherein the instrumented instructions comprise at least one instruction to inspect one or more of properties inherited from a base class of a class framework.

9. A system comprising:
   a client or server processing device operable to:
   maintain a configuration file, said configuration file including identifiers of query-execution functions;
   identify query-execution functions within binary code or intermediate code of one or more database access modules, in response to the identifiers; and
   instrument into the identified query-execution functions instructions operable to profile the query-execution functions by logging at least one of database access strings and database connection strings during runtime of the query execution functions.

10. The system of claim 9 wherein the database access string comprises a database query string, and the processing device is operable to instrument instructions for logging the database query string into the identified query-execution function.

11. The system of claim 9 wherein the database access string comprises a stored procedure name, and the processing device is operable to instrument instructions for logging the stored procedure name into the identified query-execution function.

12. The system of claim 9 wherein the processing device is operable to instrument instructions for logging the database connection string into the identified query-execution functions.

13. The system of claim 12 wherein the processing device is further operable to: c) instrument instructions for extracting from the database connection string at least one encoded connection parameter selected from the group consisting of a database identifier, a password, a communications protocol, a performance parameter and a security policy parameter.

14. The system of claim 13 wherein at least one database performance parameter is selected from the group consisting of a pooling parameter, a data compression parameter, a connection policy parameter and a connection lifetime parameter.

15. The system of claim 13 wherein the processing device is further operable to: store data describing a plurality of encoding schema for a plurality of database access modules, and
   wherein the instrumenting of instructions for extracting from the database connection string is in accordance with the appropriate stored encoding schema.

16. The system of claim 9 wherein the instrumented instructions comprise at least one instruction to inspect one or more of properties inherited from a base class of a class framework.

17. A system comprising:
   a client or server processing means;
   a means for accessing a structured data source, said source including identifiers of query-execution functions;
   means for identifying query-execution functions within binary code or intermediate code of one or more database access modules, in response to those identifiers
   means for instrumenting into the identified query-execution functions instructions for logging at least one of database access strings and database connection strings during runtime.

18. A computer readable medium comprising program instructions, wherein when executed the program instructions are operable to:
  access a structured data source, said source including identifiers of query-execution functions;
  identify query-execution functions within binary code or intermediate code of one or more database access modules using the identifiers; and
  instrument into the identified query-execution functions instructions operable to profile the query-execution functions by logging at least one of database access strings and database connection strings during runtime of the query execution functions.

* * * * *